D. L. LINDQUIST.
BRAKE MAGNET PROTECTIVE AND DEMAGNETIZING DEVICE.
APPLICATION FILED MAR. 27, 1909.
1,043,528.
Patented Nov. 5, 1912.
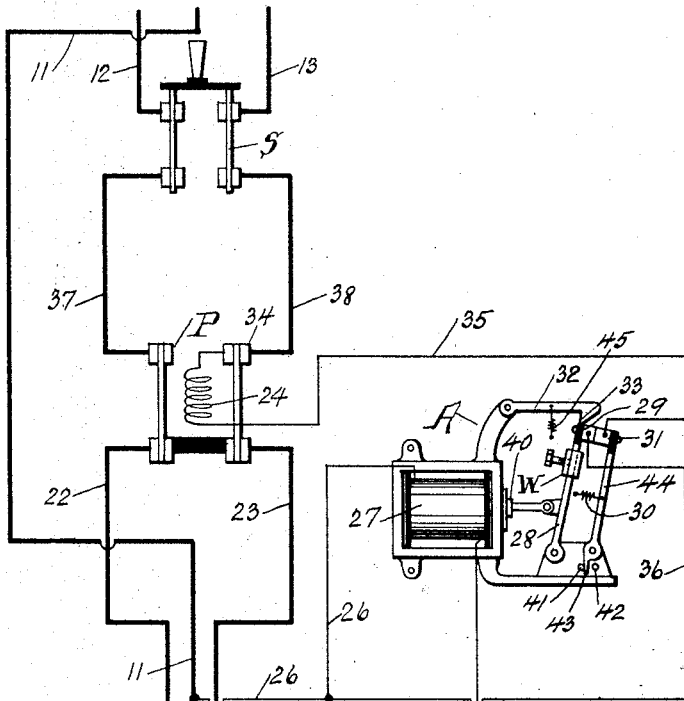
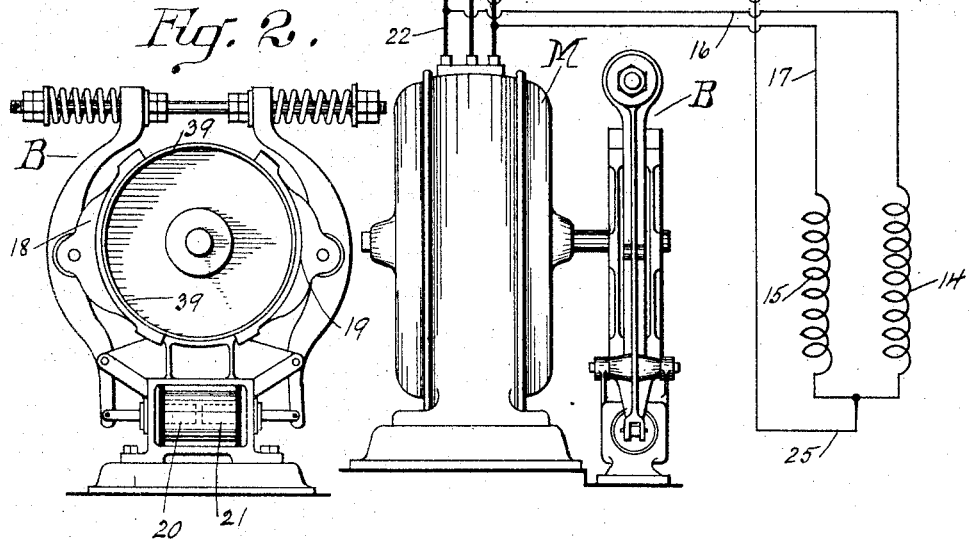

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

BRAKE-MAGNET PROTECTIVE AND DEMAGNETIZING DEVICE.

1,043,528.   Specification of Letters Patent.   Patented Nov. 5, 1912.

Application filed March 27, 1909. Serial No. 486,102.

*To all whom it may concern:*

Be it known that I, DAVID L. LINDQUIST, a subject of the King of Sweden, residing at Yonkers, in the county of Westchester and State of New York, have invented a new and useful Improvement in Brake-Magnet Protective and Demagnetizing Devices, of which the following is a specification.

My invention relates to a device and arrangement for protecting the coils of an alternating current brake magnet, and for demagnetizing the brake magnet when the brake is applied. Although my invention is herein described as applied to a two-phase three-wire motor, it may be used in conjunction with a motor of any number of phases, or connected in parallel with any inductive circuit of higher inductance than the brake winding.

One of the objects of my invention is to provide a fuseless device for protecting brake magnet coils from burning out.

A further object is to provide means for automatically demagnetizing the brake magnet when it is deënergized.

A still further object is to provide a device of this character which shall be simple, durable and cheap, and effective and efficient in operation.

For the attainment of these ends and the accomplishment of other new and useful objects, my invention consists in the features of novelty in the construction, combination and arrangement of the several parts hereinafter more specifically described and claimed in the appended claims.

In the accompanying drawing, Figure 1 illustrates an embodiment of my invention applied to a two-phase three-wire brake and motor. Fig. 2 is a side view of a brake of the type preferably employed.

My invention obviates the necessity of using fuses to protect the brake magnet winding from burning out. The use of fuses is always attended with an element of chance in their operation, and destruction of the fuse when it does operate.

My invention is designed to protect, at all times, the brake magnet winding from burning out, and to effect the demagnetization of the brake whenever the supply switch is opened, either by manual means or automatic means.

Referring to Fig. 1, a two-phase three-wire installation of my invention is shown in connection with a brake B, and a motor M. The motor M and the brake B are preferably of well known design and construction. The brake B (Fig. 2) comprises brake shoes 18, 19, placed about a brake pulley 39; the brake shoes 18 19 are lifted when the brake is energized. The cores 20, 21 move toward each other in the well known manner when the magnet is energized, and it takes much less current to retain the cores 20, 21 in their operated position than to actuate them in the first place. In case the cores 20, 21 are too far apart the current taken by the brake magnet windings 14, 15 is several times the ordinary holding current, and may be sufficient to burn out the said windings if adequate protection is not made. But when the magnet is energized the cores 20, 21 are drawn near together, and the holding current through the brake magnet windings is reduced to a minimum.

Again referring to Fig. 1, the motor M is connected to the mains 12, 13 through the two-pole switch S, wires 37, 38, operating switch P, motor leads 22, 23, to the motor M, and the common return wire 11 is connected directly to the motor M. The brake winding coils 14, 15 are connected in a parallel circuit with the windings of the motor M. The operating switch P is provided with a magnet coil 24 which holds the switch closed when current is passing through the coil, and automatically opens the operating switch P when the circuit through the magnet coil is broken.

The brake magnet coils 14 and 15 are connected in series with the magnet winding 27 of the protective device; the circuits may be traced as follows: from motor lead wire 22, through wire 16 and brake magnet winding 14 to the wire 25, and from motor lead wire 23, through wire 17 and brake magnet winding 15 to wire 25; thence through the common wire 25, magnet winding 27, and wire 26 to the common return wire 11. Thus it is seen that the motor windings and the brake magnet windings 14, 15 are in parallel circuits.

The operating switch magnet coil circuit is traced as follows: from the main 13, through the switch S, wire 38, switch contact 34, magnet coil 24, wire 35, contacts 31, 29, wire 36, wire 26, to the common return wire 11. When the contacts 29 and 31 are separated, or the switch S is opened, the circuit through the magnet coil is opened, and the operating switch P opens automatically.

The brake protecting device A comprises a magnet winding 27, a core 40 movable therein, and adapted to be attracted by current flowing in the winding 27. This core 40 is attached to the pivoted lever 28 which carries an adjustable retarding weight W and an electrical contact 29. Another pivoted lever 44 carries a contact 31 which bears yieldingly against the contact 29; this yielding connection is effected by means of the spring 30 attached to the lever 44. The lever 44 is limited in its movement by the engagement of the projection 43 with the stops 41 and 42; when the lever 28 is slightly moved the lever 44 follows, keeping the contacts 29, 31 in electrical connection; but when the attraction caused by current flowing in winding 27 is sufficiently great the lever 28 is moved so far that the lever 44, in following, strikes the stop 42, and can go no farther, whereby the contacts 31, 29 are separated.

The weight W is placed on the lever 28 to make the movement of the lever sluggish in action, and this lever is so adjusted with respect to the magnet winding 27 that the ordinary current flowing through the magnet winding 27 will not cause sufficient movement of the lever 28 to separate contacts 29 and 31. But if, for any reason, the current taken by the brake windings 14, 15 is so far in excess of the normal current thereof, and continues for such a time as to endanger the brake windings 14, 15, the lever 28 will be attracted sufficiently to part the contacts 29 and 31, the lever 28 will be caught by the shoulder 33 of the pawl 32 which is in tension caused by the spring 45, and the lever 28 will be prevented from reconnecting the contacts 29 and 31 until it is released from the shoulder 33. Separation of the contacts 29 and 31 breaks the circuit including the magnet coil 24, thereby allowing the operating switch P to open, which breaks the circuits to the motor M and to the brake B, causing the motor to be stopped. The coil spring 30 may be so adjusted as to vary the pressure of the contact 31 against contact 29 and lever 28.

It has been found that when two inductive devices are connected in parallel, as for instance the motor M and the brake B shown in the accompanying drawing, the higher inductance discharges through the lower when the current supply to both is broken, thereby exerting a demagnetizing influence on the lower inductance. That is, if the motor M is in operation and the brake coils 14, 15 are receiving current, the motor windings and the brake coils are in parallel circuits, as previously explained; if either the switch S or the operating switch P is opened, the inductance of the motor windings overcomes the lower inductance of the brake windings, and demagnetizes the brake magnet. The advantage of this demagnetizing action is to assist in applying the brake B when the supply current is cut off by the manual opening of switch S or operating switch P. The circuit through the motor and brake during the demagnetization is deemed sufficiently clear not to warrant a detailed description.

To start the motor, both the manual switch S and the operating switch P must be closed. The brake magnet will then be energized, and the cores 20, 21 drawn together to release the brake pulley wheel 39.

The current taken by the brake magnet windings 14 and 15 passes through the magnet coil 27, in series with the said windings, but the current is not ordinarily sufficient to operate the pivoted armature lever 28. The contacts 29 and 31 close the circuit through the operating switch holding coil 24. The action of the brake magnet protecting device A may be adjusted to suit various conditions, by varying the position or size of the weight W, and by varying the tension of the spring 30 on the contact 31 which bears against the contact 29. The automatic opening of the operating switch P by the action of the safety device or the manual opening of the knife switch S cuts off the current supply, automatically demagnetizes the brake magnet and permits the brake to be applied and stop the motor.

It is to be understood that although my invention is described as applied to a brake magnet, it may be used in connection with any two or more inductive devices in parallel, when the current through one or more of them is subject to changes; my invention is suitable both for protecting the devices from too great a current and also for demagnetizing them.

I desire not to be limited to the exact construction, combination and arrangement of the several parts, as it is evident that various changes may be made by those skilled in the art without departing from the spirit and scope of the invention; but

What I claim and desire to secure by Letters Patent of the United States is:—

1. In combination, an alternating current brake, an alternating current motor, means for supplying current to the two in parallel, and means dependent for operation upon the current through the brake for cutting off the means of current supply to the motor and brake without altering the connections between the latter.

2. The combination of an alternating current brake magnet and an alternating current motor connected in parallel, current supply connections to the brake and the motor, and electro-responsive means controlled by the current through one of said parts for breaking the said connections without destroying said parallel connection.

3. The combination of an alternating current motor and an alternating current brake of unequal inductance connected in parallel, means for supplying current thereto, and electro-responsive means controlled by current in the brake magnet circuit for breaking the supply of current to the motor and the brake and permitting the induced current of the motor to flow through the brake magnet windings.

4. The combination with current supply mains, of an operating switch, an alternating current motor and a brake connected in parallel, an electro-magnetic protective device operative to open the operating switch when the current through the brake winding is a predetermined amount.

5. The combination with current supply mains, of an alternating current brake, a motor connected in parallel therewith, an operating switch to connect the motor and brake to the supply mains, an electro-responsive device responsive to current in the brake magnet circuit and operative to open the operating switch, thereby permitting the inductive current of the motor to flow through the brake windings to demagnetize the brake.

6. The combination with current supply mains, of an alternating current brake, an alternating current motor, a manual switch, an operating switch, an electro-magnetic protective device connected in series with the brake windings and operative to effect the opening of the operating switch, and parallel circuits connecting the brake and motor when the switches that connect the brake and the motor to the mains are open or closed, thereby permitting the inductive current of the motor to discharge through the brake when either of said switches are opened.

7. The combination of an alternating current brake, an alternating current motor, an operating switch, a brake magnet winding protective device which is operative to open the operating switch when the current through the brake winding is too great, and a parallel circuit connecting the brake and the motor whereby the brake magnet is demagnetized when the operating switch opens.

8. The combination of a motor, a brake in conjunction therewith, a brake magnet protective device having a magnet winding in series with the brake magnet coils, an operating switch automatically opened by the electro-responsive action of the protective device when too great a current flows in the magnet winding of the protective device.

9. The combination of a motor, a brake for the motor, an operating switch, a brake magnet protective device having a magnet winding in series with the brake magnet windings, a lever adapted to be operatively moved when too great a current flows in the protecting device magnet winding, and means for automatically breaking the circuit through the operating switch magnet coil when the lever is moved.

10. The combination with an alternating current motor, of an alternating current brake, an operating switch, a magnet winding in series with the brake winding, an armature core adapted to be operatively attracted when an excessive current flows through the magnet winding, means for automatically opening the operating switch to effect the stopping of the motor and the application of the brake when the armature core is operatively attracted.

11. The combination with an alternating current motor, of a brake connected in parallel, an operating switch, a magnet winding in series with the brake winding, an armature attracted when the said magnet winding receives current, means to vary the pull necessary operatively to attract the said armature, and means in connection with the armature for automatically opening the operating switch when the armature is operatively attracted thereby to protect the brake winding without affecting its parallel connection with the motor.

12. The combination with an alternating current motor, of an alternating current brake, an operating switch, a magnet winding in series with the brake magnet winding, a lever adapted to be operatively moved only when more than normal current flows in the magnet winding, an electrical contact carried by the lever, another contact corresponding therewith to close a circuit through the operating switch magnet coil, and means whereby the contacts are held in electrical connection except when more than ordinary current flows in the magnet winding.

In testimony whereof, I have signed my name to this specification in the presence of two subscribing witnesses.

DAVID L. LINDQUIST.

Witnesses:
ROGER W. FLAGG,
EDWARD H. STEELE.